United States Patent
Mei

(10) Patent No.: US 9,226,055 B2
(45) Date of Patent: Dec. 29, 2015

(54) BRACKET WITH SOUND BOXES FOR A TABLET ELECTRONIC DEVICE

(71) Applicant: Qingkai Mei, Shenzhen (CN)

(72) Inventor: Qingkai Mei, Shenzhen (CN)

(*) Notice: Subject to any disclaimer, the term of this patent is extended or adjusted under 35 U.S.C. 154(b) by 41 days.

(21) Appl. No.: 14/371,762

(22) PCT Filed: Nov. 23, 2012

(86) PCT No.: PCT/CN2012/085180
§ 371 (c)(1),
(2) Date: Jul. 11, 2014

(87) PCT Pub. No.: WO2014/075335
PCT Pub. Date: May 22, 2014

(65) Prior Publication Data
US 2015/0010188 A1 Jan. 8, 2015

(30) Foreign Application Priority Data

Nov. 16, 2012 (CN) .......................... 2012 1 0465167

(51) Int. Cl.
*H04R 1/02* (2006.01)
*F16M 11/04* (2006.01)
*F16M 11/38* (2006.01)
*F16M 13/00* (2006.01)
*F16M 11/10* (2006.01)
*H04R 5/02* (2006.01)

(52) U.S. Cl.
CPC .............. *H04R 1/02* (2013.01); *F16M 11/041* (2013.01); *F16M 11/10* (2013.01); *F16M 11/38* (2013.01); *F16M 13/00* (2013.01); *H04R 5/02* (2013.01); *H04R 2201/025* (2013.01); *H04R 2499/11* (2013.01); *H04R 2499/15* (2013.01)

(58) Field of Classification Search
CPC ................... H04R 2205/021; H04R 2499/15; H04R 5/02
USPC ............................................. 381/333
See application file for complete search history.

(56) References Cited

U.S. PATENT DOCUMENTS

| | | | |
|---|---|---|---|
| 8,833,716 B2* | 9/2014 | Funk ...................... | F16M 13/02 248/309.1 |
| 9,002,050 B2* | 4/2015 | Widner .................... | H04R 5/02 381/300 |
| 9,025,327 B2* | 5/2015 | Noguchi ............... | G06F 1/1632 361/679.17 |
| 2009/0180660 A1* | 7/2009 | Groset ..................... | H04R 5/02 381/386 |
| 2013/0083953 A1* | 4/2013 | Chang ................... | G06F 1/1628 381/333 |

FOREIGN PATENT DOCUMENTS

| CN | 2838190 Y | 11/2006 |
|---|---|---|
| CN | 202118467 U | 1/2012 |

OTHER PUBLICATIONS

International Search Report of PCT Patent Application No. PCT/CN2012/085180 issued on Jul. 25, 2013.

* cited by examiner

*Primary Examiner* — Mark Blouin

(57) ABSTRACT

A bracket with sound boxes for a tablet electronic device, comprises an arch-shaped connecting piece and sound boxes respectively installed on two opposite ends of the arch-shaped connecting piece. Opposite inner sides of the two sound boxes are respectively provided with a fixing holder for erecting the tablet electronic device. The bracket implements the integration of the bracket for a tablet electronic device and a sound system. When the tablet electronic device and sound system in use need to be moved, only the bracket needs to be moved, which facilitates movability and portability.

10 Claims, 11 Drawing Sheets

BRACKET WITH SOUND BOXES FOR A TABLET ELECTRONIC DEVICE

TECHNICAL FIELD

The present invention relates to tablet electronic devices, in particular, to a bracket with sound boxes for a tablet electronic device.

BACKGROUND

With the development of science and technology, the tablet electronic devices, such as tablets, smart phone, MP4 players, etc., are used widely. When people use these devices, they need the sound. However, the effect of the sound output by these tablet electronic devices is often poor, it is hard to meet the high quality requirement. Therefore, most of the time, when these tablet electronic devices are used, an external sound box is used to output audio. Especially to get a good audio effect, two separate speakers are often used to achieve stereo effect. At present, most stereo system are two separate speakers, when used, the two speakers are placed separately. But this stereo system is not portable. And when people use tablet electronic devices, especially to listen to the music or watch movies, if people hold the tablet electronic device for a long time with the hand, people will feel tired, sometimes if people have to do some other things, it is also inconvenient. Therefore a holder is usually needed to erect the tablet electronic device, to set hands free. If people add a holder to erect the tablet electronic device, when wanting to move the tablet electronic device, people have to move more than one devices, that is the holder and sound boxes, which is very inconvenient, and also is difficult to facilitate portability of the tablet electronic device.

SUMMARY

The present invention aims at providing a bracket with sound boxes for a tablet electronic device to solve the problem existing in the prior art that it is inconvenient to carry and move the tablet electronic device when the tablet electronic device is connected to the holder and external sound box.

The present invention is implemented by a bracket with sound boxes for a tablet electronic device, the bracket with sound boxes for a tablet electronic device comprises an arch-shaped connecting piece and sound boxes respectively installed on two opposite ends of the arch-shaped connecting piece, opposite inner sides of the two sound boxes are respectively provided with a fixing holder for mounting the tablet electronic device thereon.

Specifically, the fixing holder comprises a base seat installed onto the sound box, and the base seat is provided with a slotting being inserted into by the tablet electronic device.

More specifically, an inner side of each of two opposite side walls of the slotting is provided with an elastic bulge for clamping the tablet electronic device.

Furthermore, the fixing holder further comprises a horizontal rotation axis, and the base seat is connected to the corresponding sound box via the horizontal rotation axis.

Furthermore, the opposite inner sides of the two sound box are provided with a groove, and the fixing holder is installed in the groove.

Specifically, the arch-shaped connecting piece comprises an arch-shaped connecting frame and a stretch rod for changing a relative position between the two sound boxes, and the stretch rod is movably installed onto the arch-shaped connecting frame.

More specifically, the number the stretch rod is two, the two stretch rods are configured to connect the two sound box to two ends of the arch-shaped connecting frame, one end of the stretch rod is movably installed onto a corresponding end of the arch-shaped connecting frame and the other end of the stretch rod is slidably inserted into the corresponding sound box.

Furthermore, the arch-shaped connecting piece further comprises a connecting rotation axis, one end of the stretch rod is installed onto the corresponding end of the arch-shaped connecting frame through the connecting rotation axis.

Furthermore, each of the sound box comprises a housing, a speaker accommodated in the housing, and a vibration film disposed in the housing, and a rear end of the housing is connected with the arch-shaped connecting piece.

Furthermore, the number of the vibration film is at least two, the vibration films are arranged in parallel, and a space exist between two adjacent vibration films.

The present invention comprises two sound boxes, and the two sound boxes are connected together through the arch-shaped connecting piece, such that the two Sound boxes is separated to achieve the stereo effect. Meanwhile the sound boxes may be picked up by taking up the arch-shaped connecting piece, which facilitates portability. The opposite inner sides of the two sound boxes are respectively provided with a fixing holder for erecting the tablet electronic device, the tablet electronic device is erected through the fixing holder, which realizes the integration of the bracket for a tablet electronic device and the sound box. To move the tablet electronic device and the sound box in use, people can just move the bracket, that facilitates movability and portability.

Furthermore, in the present invention, the fixing holder is pivotally connected to the corresponding sound box through the horizontal rotation axis, such that the fixing holder may be turned an angle, then the erecting angle of the tablet electronic device may be adjusted to meet the requirement from different people about the visual angle to the tablet electronic device.

The arch-shaped connecting piece comprises an arch-shaped connecting frame and two stretch rods, one end of the stretch rod is connected to the arch-shaped connecting frame and the other end is movably installed into the sound box, such that the distance between the two sound boxes may be changed by changing the length of the part of the stretch rod inserted into the sound box, therefore the versatility of the bracket may be realized.

The stretch rod is connected to the corresponding end of the arch-shaped connecting frame through the connecting rotation axis, such that the stretch rod may be folded inward, which leads the two sound boxes to be folded inward, to reduce the volume of the bracket and then to facilitate the storage, transport and carry.

DETAILED DESCRIPTION

To make the objectives, technical solutions and advantages of the present invention clearer, the present invention will be further described hereinafter with reference to the accompany drawings and embodiments. It shall be understood that, the embodiments described herein are only intended to illustrate but not to limit the present invention.

The present invention provides a bracket with sound boxes for a tablet electronic device, the bracket with sound boxes for a tablet electronic device comprises an arch-shaped connecting piece and sound boxes respectively installed on two opposite ends of the arch-shaped connecting piece, opposite inner sides of the two sound boxes are respectively provided with a fixing holder for erecting the tablet electronic device.

Two sound boxes are arranged, and the two sound boxes are connected together through the arch-shaped connecting piece, such that the two sound boxes are separated to achieve the stereo effect. Meanwhile the sound boxes may be picked up by taking up the arch-shaped connecting piece, which facilitates portability. The opposite inner sides of the two sound boxes are respectively provided with a fixing holder for erecting the tablet electronic device, the tablet electronic device is erected through the fixing holder, which realizes the integration of the bracket for a tablet electronic device and the sound box. To move the tablet electronic device and the sound box in use, people can just move the bracket, that facilitates movability and portability.

The First Embodiment of the Present Invention

Figure 1:
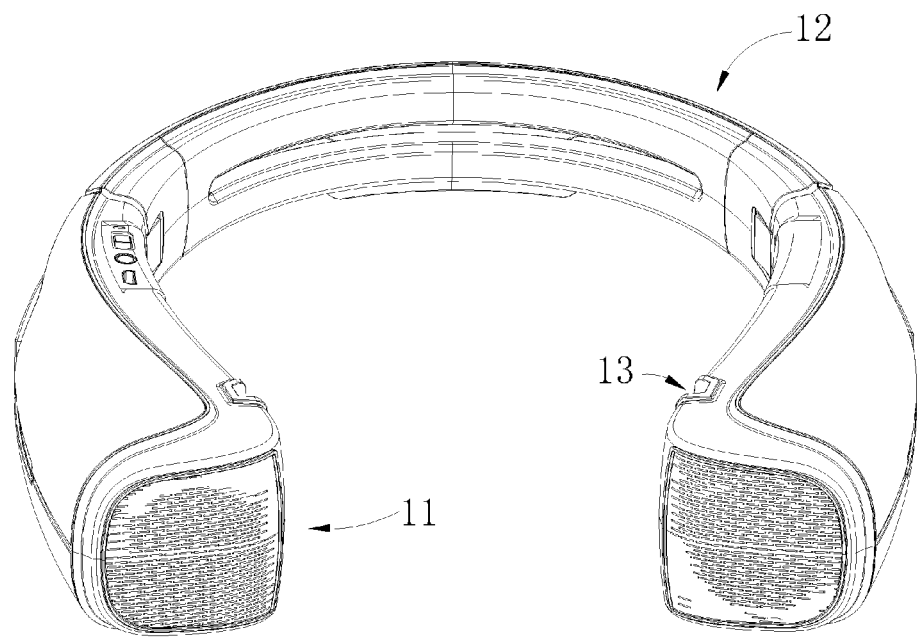
FIG. 1 is a schematic perspective structure view of a bracket with sound boxes for a tablet electronic device according to a first embodiment of the present invention.
Figure 2:
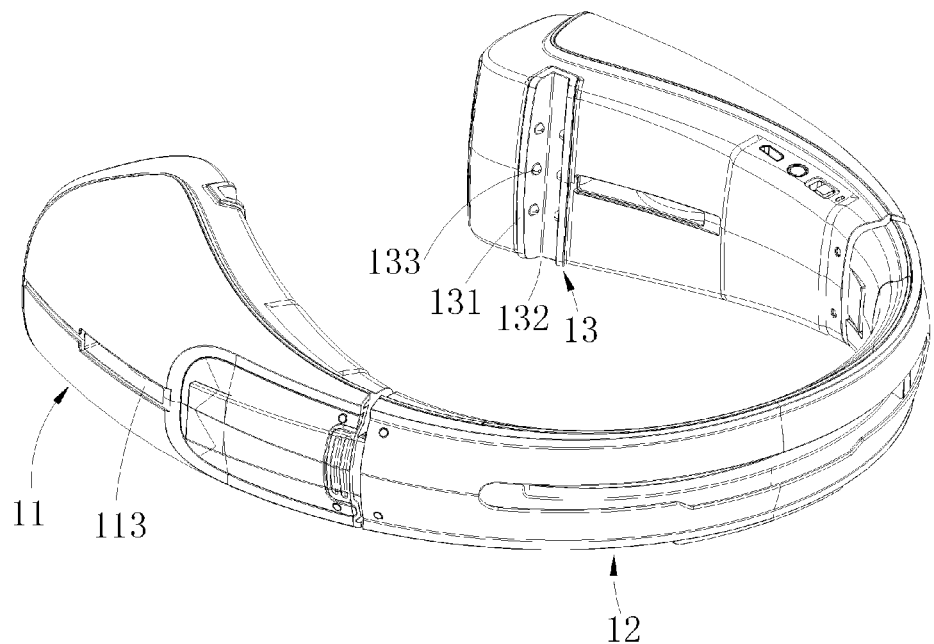
FIG. 2 is a schematic perspective structure view of the bracket with sound boxes for a tablet electronic device of FIG. 1 in other direction.

Referring time FIGS. 1 and 2, the bracket with sound boxes for a tablet electronic device, includes an arch-shaped connecting piece 12 and sound boxes 11 respectively installed on two opposite ends of the arch-shaped connecting piece 12, opposite inner sides of the two sound boxes 11 are provided with two fixing holders 13. The effect of the sound output by the sound box is improved by the two sound boxes. The two sound boxes are connected together through the arch-shaped connecting piece 12 to facilitate portability. The tablet electronic device may be erected by setting the fixing holder 13.

The fixing holder 13 comprise a base seat 131 installed onto the sound box 11, the base seat 131 is provided with a slotting 132 into which the tablet electronic device is inserted. The tablet electronic device is erected by inserting the tablet electronic device into the slotting 132. To clamp the tablet electronic device better, an inner side of each of two opposite side walls of the slotting 132 is provided with an elastic bulge 133. After the tablet electronic device is inserted into the slotting 132, the elastic bulge 133 is pressed by the tablet electronic device and then clamps the elastic bulge to prevent the tablet electronic device from sliding out. The extension direction is perpendicular to the bottom surface of the housing 111 of the sound box 11 or has a certain angle with the direction that is perpendicular to the bottom surface of the housing 111.

Figure 4:
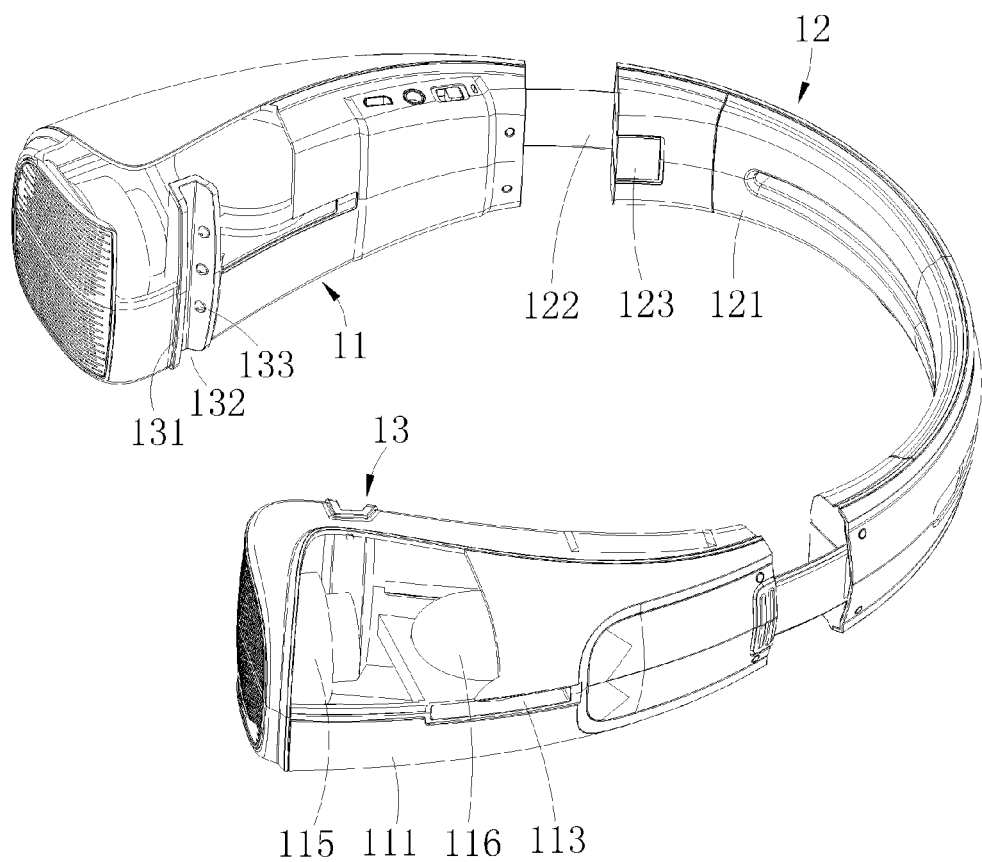
FIG. 4 is a structure view of the bracket with sound boxes for a tablet electronic device of FIG. 1 of which the stretch rod is stretched out.
Figure 5:
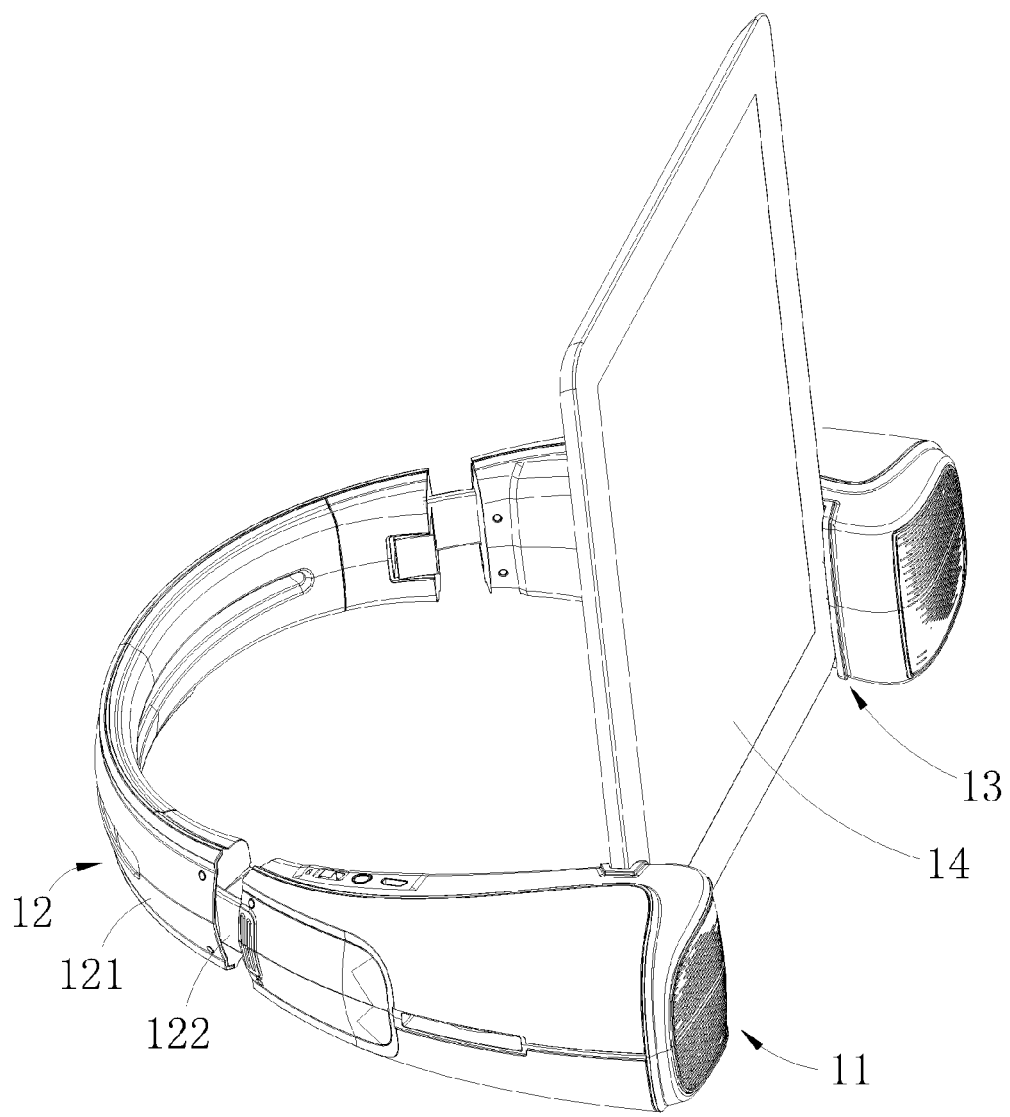
FIG. 5 is a schematic perspective structure view of the bracket with sound boxes for a tablet electronic device of FIG. 1 which mounts a tablet computer.
Figure 6:
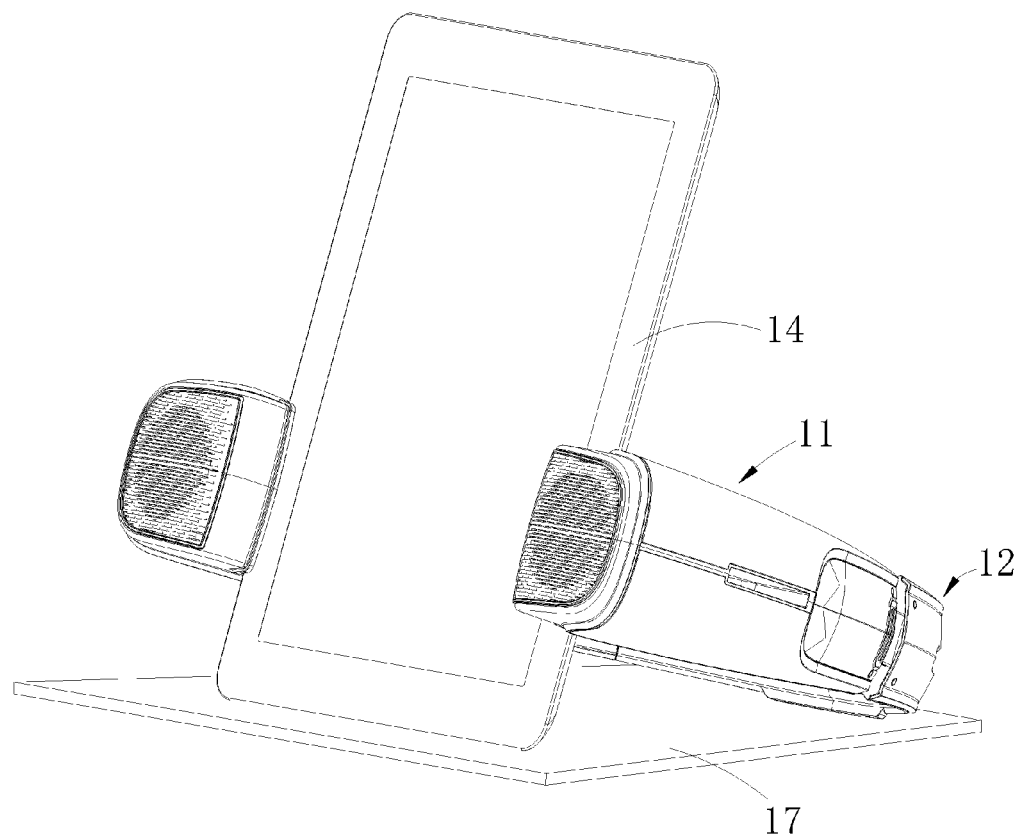
FIG. 6 is the schematic view of the bracket with sound boxes for a tablet electronic device of FIG. 1 which mounts a tablet computer and is put on the table.
Figure 7:
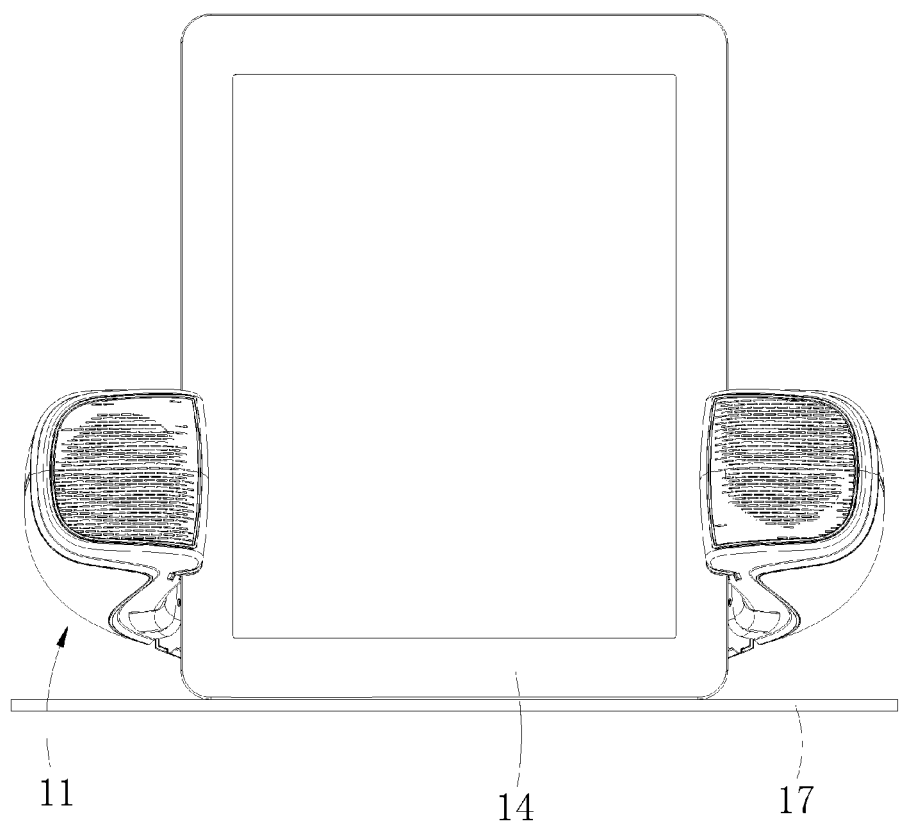
FIG. 7 is a front view of FIG. 6.
Figure 8:
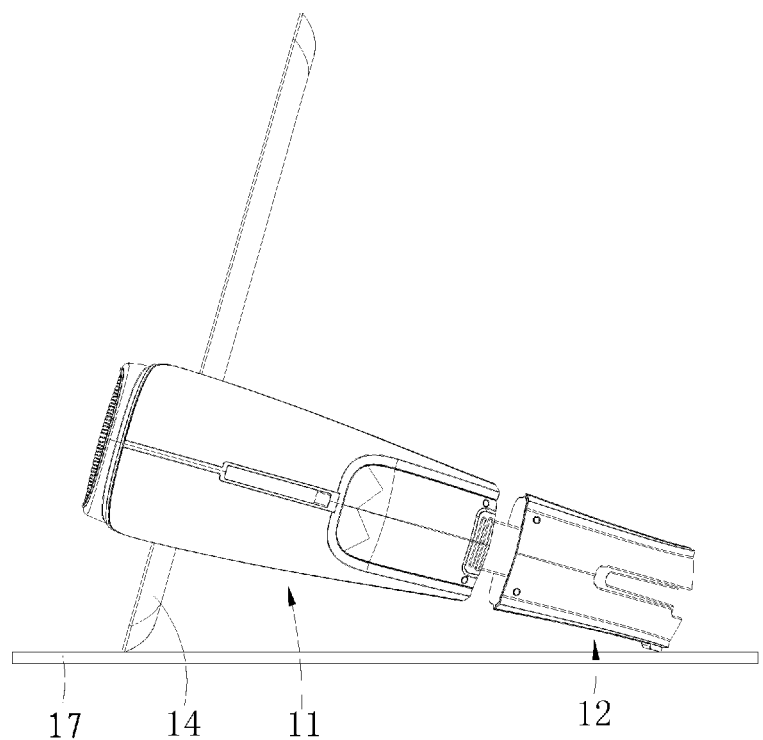
FIG. 8 is a left view of FIG. 6.

Referring to FIG. 4, the arch-shaped connecting piece 12 includes an arch-shaped connecting frame 121 and a stretch rod 122 for changing a relative position between the two sound boxes 11, the stretch rod 122 is movably installed onto the arch-shaped connecting frame 121. In this embodiment, the number the stretch rod is two, the two sound box 11 are respectively connected to the two ends of the arch-shaped connecting frame 121, one end of the stretch rod 122 is movably installed onto a corresponding end of the arch-shaped connecting frame 121 and the other end of the stretch rod 121 is slidably inserted into the corresponding sound box 11. Such that the distance between the two sound boxes 11 may be changed by changing the length of the part of the stretch rod 122 inserted into the sound box, therefore the tablet electronic device with different size may be erected, and the versatility of the bracket may be realized.

Figure 3:
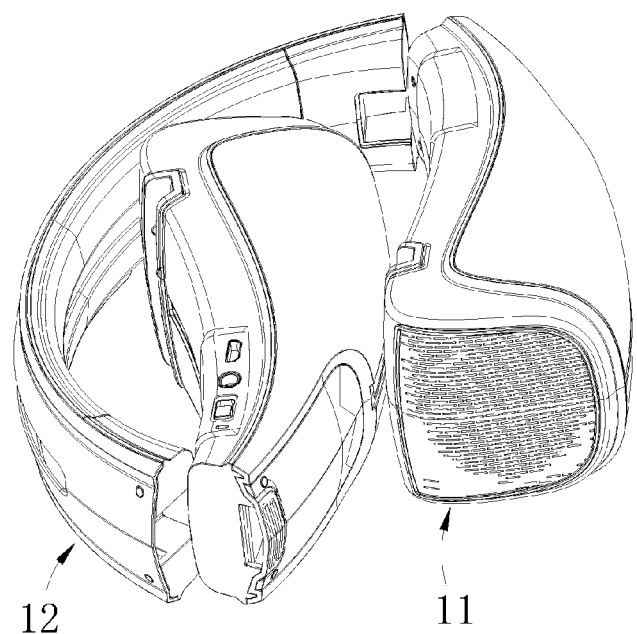
FIG. 3 is a schematic perspective structure view of the bracket with sound boxes for a tablet electronic device of FIG. 1 of which the sound boxes are folded inward.

Referring to FIGS. 3 and 4, the arch-shaped connecting piece 12 further includes a connecting rotation axis 123 disposed on the two ends of the arch-shaped connecting frame 121, the two stretch rods 122 are respectively connected the connecting rotation axis 123 on the corresponding end of the arch-shaped connecting frame 121, such that the two stretch rods 122 may by folded inward relative to the connecting rotation axis 123, which leads the two sound boxes 11 to be folded inward. In other embodiments, the two stretch rods 122 may be slidably inserted into the two ends of the arch-shaped connecting frame 121, and the two stretch rods 122 may be pivotally connected to the two sound boxes 11 respectively. Such that the two sound boxes 11 may be folded towards the inner side of the arch-shaped connecting frame 121 and the distance between the two sound boxes 11 may be changed by tough the stretch rod 122, to reduce the volume of the bracket and then to facilitate the storage, transport and carry.

In other embodiments, the number of the arch-shaped connecting frame is two, and the two arch-shaped connecting frame are respectively connected to the two sound boxes 11. The number of the stretch rod is one, two ends of the stretch rod are slidably inserted into the two arch-shaped connecting frame. Two arch-shaped connecting frame are set up and is connected together through the stretch rod, the relative position between the two sound boxes 11 may be changed by pulling out and shrinking the stretch rod, therefore the versatility of the bracket may be realized. Meanwhile, the two boxes are connected to the corresponding arch-shaped connecting frame through the rotation axis, such that the sound box is folded toward the inner side of the arch-shaped connecting frame with respect to the corresponding rotation axis, to reduce the volume of the bracket and then to facilitate the storage, transport and carry.

Referring to FIG. 5 to FIG. 8, the tablet computer 14 is inserted into the slotting 132, and the tablet computer 14 is erected. The bracket that has erected the tablet computer 14 is placed on the table 17, the oblique angle of the tablet computer 14 is adjusted to adapt the visual angle of different people by adjusting the depth of the tablet computer 14 inserted into the slotting 132. The manner of adjusting the oblique angle of the tablet computer 14 is also suitable for other tablet electronic devices.

Referring to FIG. 4, the opposite inner side of the various sound boxes is provided with a groove which is hollow in the center of the inner side, the fixing holder 13 is installed in the groove. In this embodiment, the base seat 131 is matched with and installed in the groove, it is beautiful, and the strength of the base seat 131 is improved by the housing 111 of the sound box 11 to increase the quality thereof.

Figure 9:
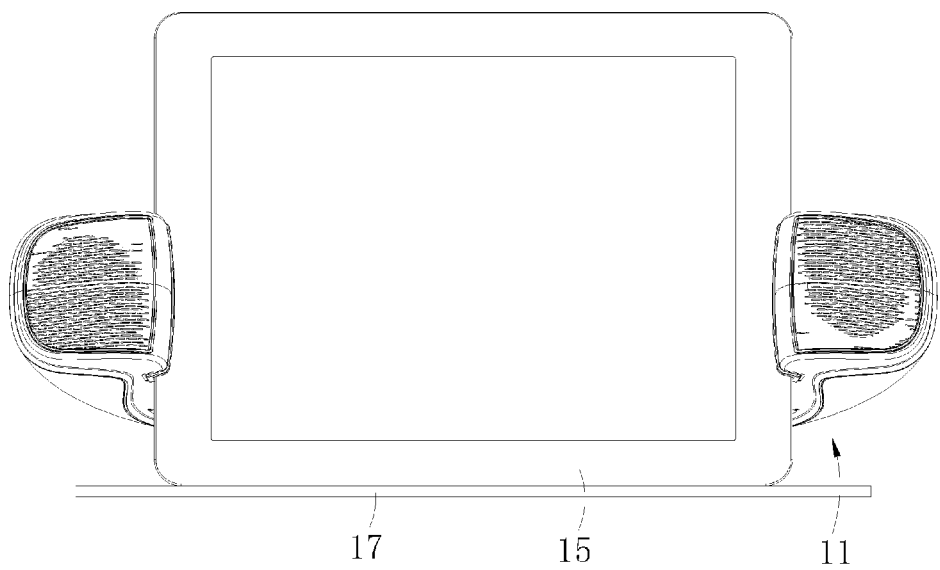
FIG. 9 is a schematic view of the bracket with sound boxes for a tablet electronic device of FIG. 1 which mounts another tablet computer and is put on the table.
Figure 10:
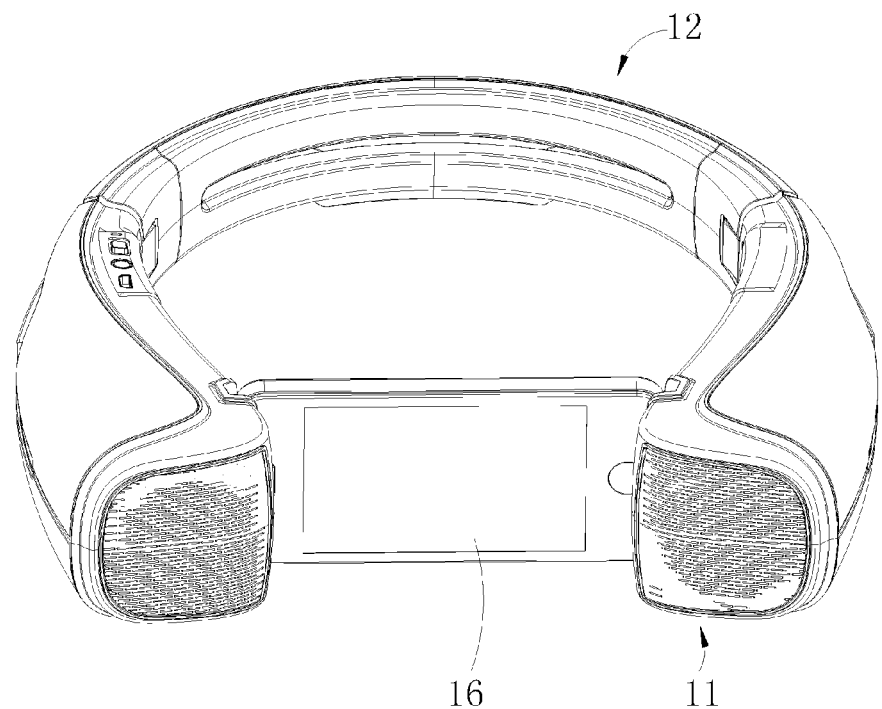
FIG. 10 is the schematic view of the bracket with sound boxes for a tablet electronic device of FIG. 1 which mounts a smart phone.

Referring to FIG. 9 and FIG. 10, the distance between the two sound boxes is adjusted through the stretch rod 122, such that the tablet electronic device with different size may be erected, for example, another tablet computer 15 is erected in FIG. 9, and a smart phone 16 is erected in FIG. 10.

Referring to FIG. 4, each sound box 11 includes a housing 111, a speaker 115 accommodated in the housing 111, and a vibration film 116 disposed in the housing 111, a rear end of the housing 111 is connected with the arch-shaped connecting piece 12. The bass effect of the sound box 111 may be enhanced through the vibration film 116, and a stereo sound angle of 360 degree may be obtained by using the vibration film 116 to enhance the effect of the sound output by the sound box 11. The number of the vibration film 116 is at least two, and the vibration films 116 are arranged in parallel, a space exists between two adjacent vibration films 116. And also referring to FIG. 2, the housing 111 is provided with a through hole 113 making the space communicate with the outside. The sound effect of the sound box 11 is enhanced by setting more than one vibration films 116. And the through hole 113 makes the space between the vibration films 116 communicate with the outside, which allow the sound made by the vibration film 116 to be sent out better, and the effect of the sound is enhanced further. The vibration film 116 is parallel with the bottom surface of the housing 111, and the corresponding through hole 113 is disposed on the two opposite side surfaces of the housing 111.

The Second Embodiment of the Present Invention

Figure 13:
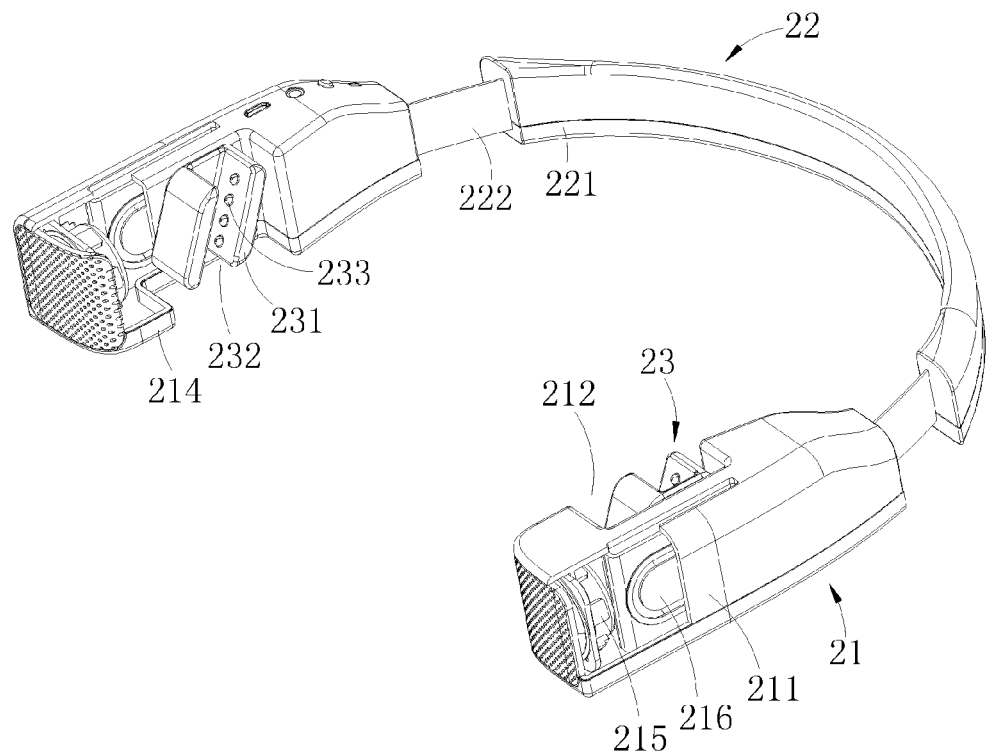
FIG. 13 is a structure view of the bracket with sound boxes for a tablet electronic device of FIG. 11 of which the stretch rod is stretched out.
Figure 14:
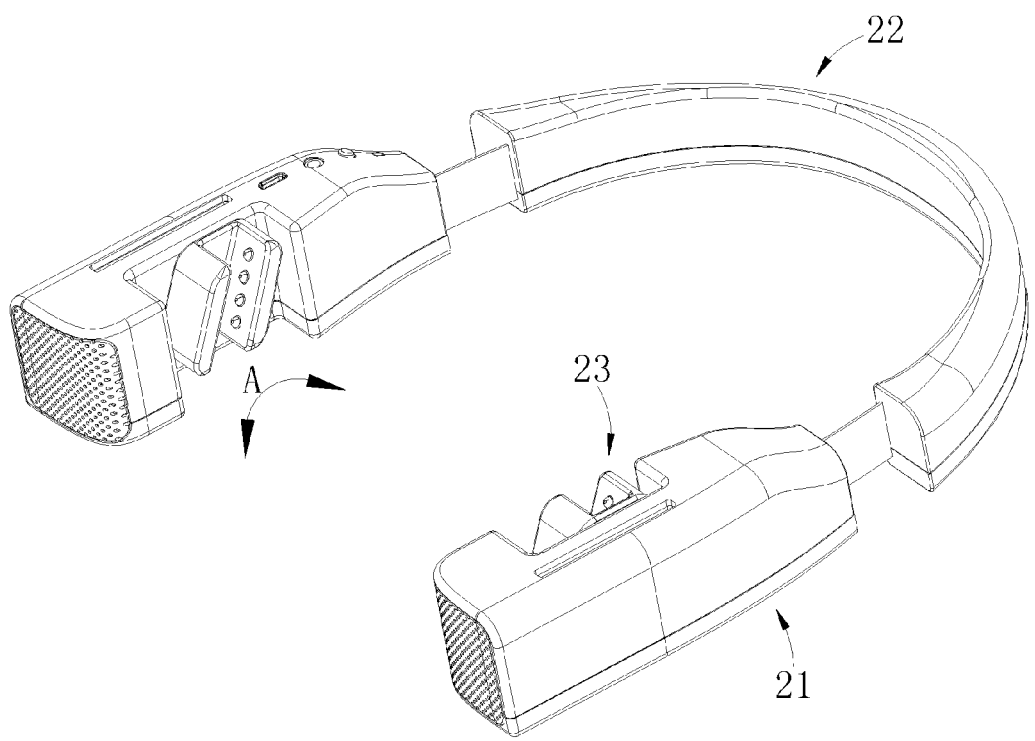
FIG. 14 is a schematic view of the bracket with sound boxes for a tablet electronic device of FIG. 11 of which the fixing holder is turned an angle along the arrow.

Referring to FIG. 11 to FIG. 14, the bracket includes two sound boxes 21 and an arch-shaped connecting piece 22 for connecting the two sound boxes 21 together, the arch-shaped connecting piece 22 includes an arch-shaped connecting frame 221 and two stretch rods 222, each sound box 21 includes a housing 211, a speaker 215, and a vibration film 216. The number of the vibration film 216 is at least two, and the vibration films 216 are arranged in parallel, a space exists between two adjacent vibration films 216. The housing 211 is provided with a through hole 213 making the space communicate with the outside. The difference between this embodiment and the first embodiment is that: the fixing holder 23 further includes a horizontal rotation axis (not shown in the figures), the base seat 131 of the fixing holder 23 is pivotally connected to the corresponding sound box 21 through the horizontal rotation axis, such that after the tablet electronic device is erected, the tablet electronic device may be rotated according to the position of the user, to get a better visual effect; meanwhile if an assembly error appears, the tablet electronic device may be erected better rotating the two fixing holder 23. In this embodiment, the grooves 212 in the opposite inner sides of the housings 211 of the two sound boxes 21 is the larger one, the fixing holder 23 is pivotally engaged in the groove 212. Because the groove 212 is the larger groove, it is convenient for the fixing holder 23 to be rotated appropriately in the groove 212 along the arrow A, such that the oblique angle of the erected tablet electronic device may be changed. When the sound box 21 is with big size and heavy weight, the oblique angle of the tablet electronic device may be adjusted better through the above structure. Referring to FIG. 13, The vibration film 216 is perpendicular to the bottom surface 214 of the housing, the corresponding through hole 213 is disposed on the top surface 211 and the bottom surface 214 of the housing.

Figure 15:
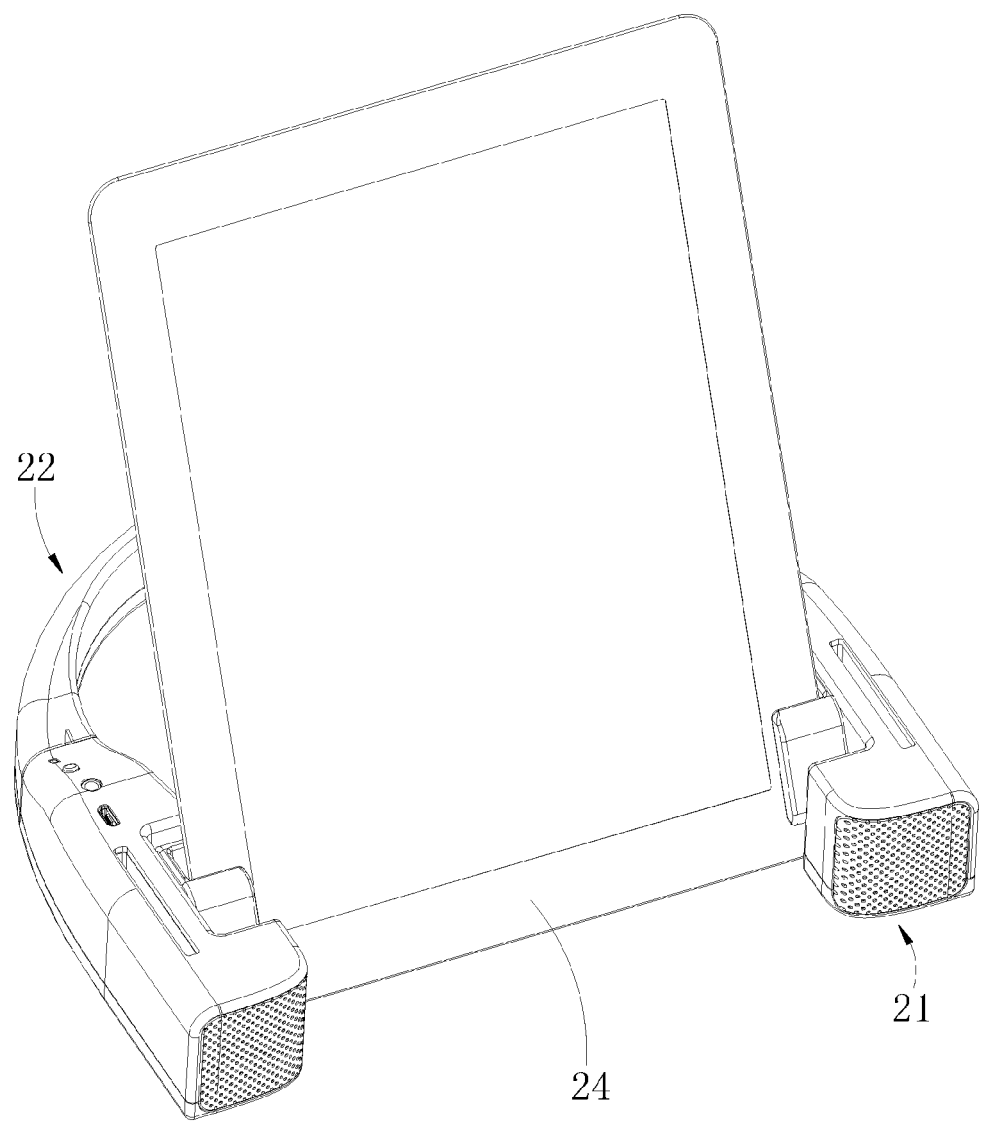
FIG. 15 is a schematic perspective structure view of the bracket with sound boxes for a tablet electronic device of FIG. 11 which mounts a tablet computer.
Figure 16:
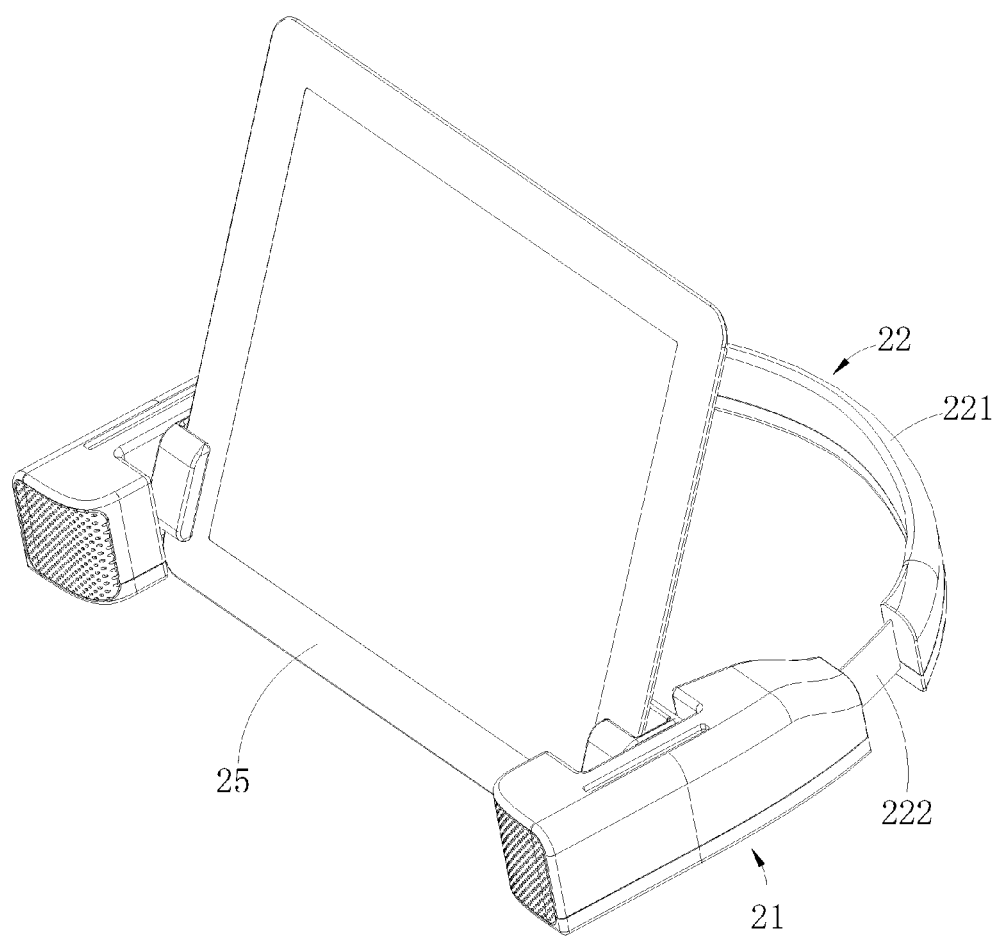
FIG. 16 is a schematic view of the bracket with sound boxes for a tablet electronic device of FIG. 11 which mounts another tablet computer and is put on the table.

Referring to FIGS. 15 and 16, the distance between the two sound boxes 21 is adjusted through the stretch rod 222, such that the tablet electronic device with different size may be erected on the sound box, for example, a tablet computer 24 is erected in FIG. 15, and another tablet computer 24 is erected in FIG. 16.

Furthermore, in the prevent invention, the stretch rods 122, 222 may be made of elastic material, and the stretch rods 122, 222 are elastic, such that when the stretch rods 122, 222 are pulled out to erect the tablet electronic device, an inward elastic force is provided to the fixing holder 13, 23, to clamp the tablet electronic device better, such that the tablet electronic device is erected more stably. The arch-shaped connecting frame 121, 221 may be also elastic, the arch-shaped connecting frame 121, 221 provide an inward elastic force to the fixing holder 13, 23 for erecting the tablet electronic device, to fix the tablet electronic device better. In the present invention, the base seat of the fixing holder 13, 23 may be made of elastic material such that the base seat is elastic, to be adapted to the tablet electronic devices with different thickness; meanwhile, the fixing holder 13, 23 and the elastic bulge 133, 233 therein are manufactured together, to enhance the strength of the elastic bulge 133, 233.

Figure 11:
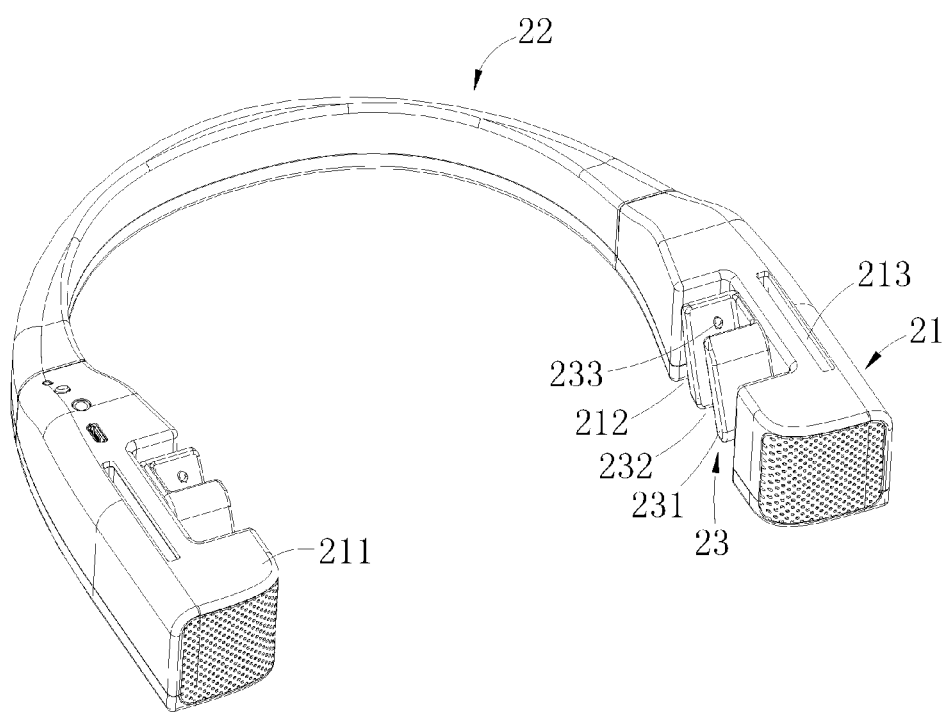
FIG. 11 is a schematic perspective structure view of the bracket with sound boxes for a tablet electronic device according to a second embodiment of the present invention.
Figure 12:
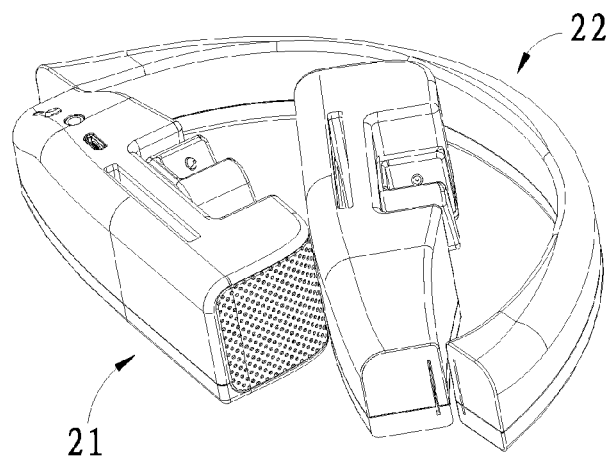
FIG. 12 is a schematic perspective structure view of the bracket with sound boxes for a tablet electronic device of FIG. 11 of which the sound boxes are folded inward.

Referring to FIG. 4, FIG. 11 and FIG. 13, in the embodiment of the present invention, the speakers 115, 215 of the two sound boxes 11, 21 are disposed on the relative front end of the sound boxes 11, 21, such that after the tablet electronic device is erected, it is convenient for the people in front of the tablet electronic device to listen to the sound output by the sound box. In order to the around person to listen to sound conveniently, the sound angle of the speakers 115, 215 may be extended toward to opposite outer sides of the sound boxes 11, 21, and more than one speakers may be disposed in each sound boxes 11, 21.

A wireless communication module may be also disposed in the sound box, such adapted Wi-Fi, Bluetooth, NFC and so on, to communicate with the tablet electronic device, and a charging module may also be arranged in the sound box to charge the erected tablet electronic device.

In order to further increase the portability, in some embodiments, a power supply module can also be disposed in the sound box, thus the sound box can be used without an external power supply.

What described above are only preferred embodiments of the present disclosure but are not intended to limit the scope of the present disclosure, any modifications, equivalent replacements and improvements etc. made within the spirit and principle of the present invention, should be included in the protection scope of the present invention.

What is claimed is:

1. A bracket with sound boxes for a tablet electronic device, characterized in that the bracket with sound boxes for a tablet electronic device comprises an arch-shaped connecting piece and sound boxes respectively installed on two opposite ends of the arch-shaped connecting piece, opposite inner sides of the two sound boxes are respectively provided with a fixing holder for mounting the tablet electronic device thereon.

2. The bracket with sound boxes for a tablet electronic device of claim 1, wherein the fixing holder comprises a base seat installed onto the sound box, and the base seat is provided with a slotting being inserted into by the tablet electronic device.

3. The bracket with sound boxes for a tablet electronic device of claim 2, wherein an inner side of each of two opposite side walls of the slotting is provided with an elastic bulge for clamping the tablet electronic device.

4. The bracket with sound boxes for a tablet electronic device of claim 2, wherein the fixing holder further comprises a horizontal rotation axis, and the base seat is connected to the corresponding sound box via the horizontal rotation axis.

5. The bracket with sound boxes for a tablet electronic device of claim 1, wherein the opposite inner sides of the two sound box are provided with a groove, and the fixing holder is installed in the groove.

6. The bracket with sound boxes for a tablet electronic device of claim 1, wherein the arch-shaped connecting piece comprises an arch-shaped connecting frame and a stretch rod for changing a relative position between the two sound boxes, and the stretch rod is movably installed onto the arch-shaped connecting frame.

7. The bracket with sound boxes for a tablet electronic device of claim 6, wherein the number the stretch rod is two, the two stretch rods are configured to connect the two sound box to two ends of the arch-shaped connecting frame, one end of the stretch rod is movably installed onto a corresponding end of the arch-shaped connecting frame and the other end of the stretch rod is slidably inserted into the corresponding sound box.

8. The bracket with sound boxes for a tablet electronic device of claim 7, wherein the arch-shaped connecting piece further comprises a connecting rotation axis, one end of the stretch rod is installed onto the corresponding end of the arch-shaped connecting frame through the connecting rotation axis.

9. The bracket with sound boxes for a tablet electronic device of claim 1, wherein each of the sound box comprises a housing, a speaker accommodated in the housing, and a vibration film disposed in the housing, and a rear end of the housing is connected with the arch-shaped connecting piece.

10. The bracket with sound boxes for a tablet electronic device of claim 9, wherein the number of the vibration film is at least two, the vibration films are arranged in parallel, and a space exists between two adjacent vibration films.

* * * * *